No. 611,513. Patented Sept. 27, 1898.
C. G. SCHERER & E. HILT.
CORN HARVESTER.
(Application filed Feb. 26, 1897.)
(No Model.)
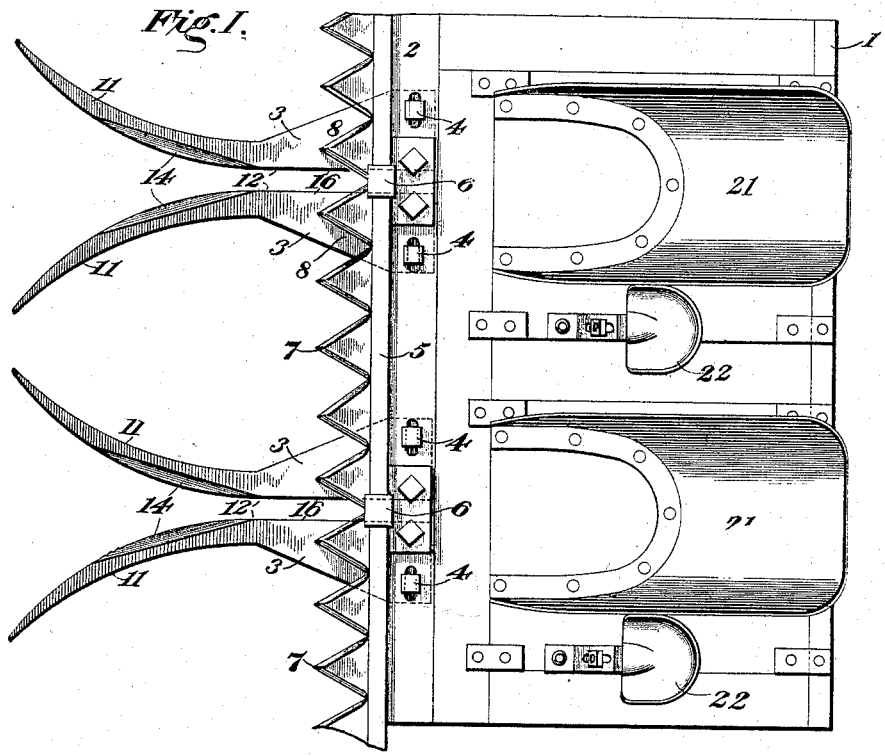
Fig. I.
Fig. II.
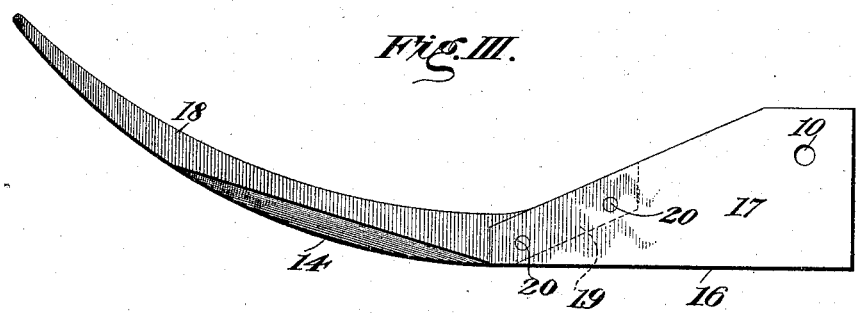
Fig. III.
Fig. IV.
Witnesses
M. E. Fowler
S. M. Acker
Inventors:
Charles G. Scherer
and Edward Hilt
By James L. Atkins
Attorney
THE NORRIS PETERS CO., PHOTO-LITHO., WASHINGTON, D. C.

UNITED STATES PATENT OFFICE.

CHARLES G. SCHERER AND EDWARD HILT, OF LAFAYETTE, INDIANA.

CORN-HARVESTER.

SPECIFICATION forming part of Letters Patent No. 611,513, dated September 27, 1898.

Application filed February 26, 1897. Serial No. 625,161. (No model.)

*To all whom it may concern:*

Be it known that we, CHARLES G. SCHERER and EDWARD HILT, of Lafayette, in the county of Tippecanoe, State of Indiana, have invented certain new and useful Improvements in Corn-Harvesters, of which the following is a complete specification, reference being had to the accompanying drawings.

The object of our invention is to produce improvements in corn-harvesters whereby the power necessary to be employed for operating a harvester in standing corn is materially diminished.

Our invention relates particularly to improvements in combined guards and knives adapted to coöperate with a reciprocatory cutter-bar whereby the forward motion or thrust of the combined guards or knives is employed to partially sever the corn.

Heretofore while it has been entirely practicable to employ machines embodying reciprocatory sickle-bars for the harvesting of small grain having comparatively light stalks that are easily severed the attempt to use such a machine in cutting heavy cornstalks has been attended by the necessity of employing so much power as to be practically prohibitory.

By our invention, as above suggested, we reduce the amount of work necessary to be performed by the cutting-teeth to a degree scarcely, if at all, exceeding the work which the machine has to do in cutting small grain.

In the accompanying drawings, Figure I illustrates a portion of the platform of any ordinary type of reciprocatory knife-bar reaper, showing our combined guards and knives secured to the finger-bar thereof. Fig. II is an inner edge view of one of the guards and knives detached, showing its cutting edges. Fig. III is a top plan view of a guard and knife made in two pieces. Fig. IV is an edge view of the same corresponding to Fig. II.

Referring to the figures on the drawings, 1 indicates the platform of a reaper which, our invention being adaptable to a number of varieties of harvesters or cutting-machines in which stationary knives coöperate with the teeth of a reciprocatory sickle, is employed to illustrate the class at large.

The driving mechanism, gearing, and the like being susceptible of wide variation through the different types of machines of the general class above referred to and all being more or less matters of familiar acquaintance to those skilled in the art, we do not deem it necessary to illustrate or describe such details and illustrate and define only those features which are directly related to our invention. Coming within that category is the finger-bar 2, secured upon the forward part of the platform in any suitable and ordinary manner. The finger-bar carries our combined knives and guards 3, secured in place by bolts 4, which, if an old machine is to be equipped with our device, may be the same bolts which secure the ordinary knives to the finger-bar.

5 indicates a reciprocatory sickle-bar secured in bearings 6 in operative relation with the finger-bar and the combined guides and knives and moving longitudinally with respect to the bar and transversely with respect to the guides and knives. The sickle-bar is provided, as usual, with the sickle-sections 7.

The above-described mechanism, with the exception of the combined knives and guides, being of ordinary construction, as has been stated, and the gist of our invention residing in the embodiment, in a harvesting-machine, of combined guides and knives of peculiar structure performing a novel function, we shall proceed to describe them in detail.

Our combined knives and guides are arranged in pairs composed of opposite complementary members. Each member consists of a body part 8, that is made sufficiently broad to insure its strong and rigid support upon the finger-bar. It is preferably provided with bolt-holes 10, through which the bolts 4 may be passed for securing it to the finger-bar. Each member is provided with a curved forward extension or finger 11. The opposite faces of each pair of members converge as the fingers approach their respective body parts, the opposite edges 12 of which continue substantially parallel. Upon the converging edges of the fingers 11, adjacent to those portions at which they approach most nearly to each other, we provide, as by beveling, cutting edges 14. The distance between the fingers at its narrowest part may be regulated by adjusting the combined guides and knives to and from each other, which may be accomplished in any suitable manner—as, for example, by the employment of oblong bolt-holes in their respective body parts or in the cutter-bar, if preferred. In the opposite parallel edges in the body part we provide, as by beveling, cutting edges 16, the bevel which forms them being located upon the under side of the body parts, thus bringing the cutting edges in operative relation with the edges of the sickles 7, which reciprocate across them in the usual manner, as above set forth.

We prefer to locate the cutting edges 14 and 16, respectively, upon opposite sides of the members in which they are formed—that is to say, the cutting edge 14 is in the plane of the lower face of the cutter or knife and the edge 16 is in the plane of the opposite or upper face. It will then appear that when the kerf is formed in the stalk by the cutting edge 14 the knife will be passed through the kerf until the cutting edge 16 reaches the stalk. This edge will then enter the kerf made by the knife 14, but being oppositely disposed or, in other words, being formed by an opposite bevel, the fiber will be additionally weakened, as the edge 16 while entering the kerf does not lie in exactly the same plane with the edge 14. It should be remembered that the guards are of no considerable thickness, and hence the oppositely-disposed cutting edges simply serve to make an incision and to thereafter slightly enlarge the same by additional mangling or cutting of the fiber. Further progress of the harvester will present the stalk to the sickle the cutting edges of which are directly imposed upon the cutting edges 16 and coöperate therewith to sever the stalk with a shearing cut.

Owing to the size of the combined knives and guides, it may be desirable to make them of two pieces. Such a construction is shown in Figs. III and IV of the drawings, in which 17 indicates the body part, 18 a finger, and 19 a deflected shank upon the finger, whereby, as by means of bolts 20, the body part and finger may be rigidly united. With the exception of their detachability the finger and body part are constructed substantially in the manner above described.

In practice the machine being drawn by horse-power or impelled in any suitable manner is advanced in the direction of the rows of corn and in such manner that each pair of fingers straddles a row, and gathering the corn in each row between them respectively forces it between the converging edges 14, thereby partially, though not completely, severing the corn and cutting through the the greater portion of its hard outer covering. The stalks, after being passed between the edges 14 and being by them partially severed, are next caught by the sickle-sections 7 and are by them completely severed. Owing to the weight of the stalks we prefer to provide for their reception after being severed a scoop 21 in the rear of each pair of guards and knives and adjacent to each scoop a seat 22, which is preferably vertically adjustable and which is designed to accommodate an operator sitting thereon, who, by the aid of a curved instrument shaped like a hand-sickle, guides the severed stalks into the scoop, from which they may be removed as often as required.

What we claim is—

1. In a corn-harvester, the combination with a frame, of combined knives and guards arranged in pairs thereon, two sets of cutting edges upon each of the guards arranged upon opposite sides thereof, a reciprocatory sickle-bar working upon the knives, and coöperatively with the second set of cutting edges, the forward set of cutting edges adapted to partially sever the corn, and the second set of cutting edges, with the sickle-sections, adapted to completely sever it, substantially as set forth.

2. As a part of a corn-harvester, a combined knife and guard consisting of a body part and curved finger, of a cutting edge near the juncture of the finger and body part, and a second cutting edge in the body part located upon the opposite side from the first-named cutting edge, substantially as set forth.

In testimony of all which we have hereunto subscribed our names.

CHARLES G. SCHERER.
EDWARD HILT.

Witnesses:
C. H. WILKINSON,
C. H. GWIN.